(12) United States Patent
Pissavin et al.

(10) Patent No.: US 12,065,260 B2
(45) Date of Patent: Aug. 20, 2024

(54) AIRCRAFT COMPRISING AT LEAST ONE HYDROGEN SUPPLY DEVICE AND AT LEAST ONE SEALED CONTAINER, IN WHICH AT LEAST ONE ITEM OF EQUIPMENT OF SAID HYDROGEN SUPPLY DEVICE IS POSITIONED

(71) Applicants: Airbus SAS, Blagnac (FR); Airbus Operations SAS, Toulouse (FR)

(72) Inventors: Alexis Pissavin, Blagnac (FR); Lionel Czapla, Toulouse (FR); Alistair Forbes, Toulouse (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

(21) Appl. No.: 17/878,346

(22) Filed: Aug. 1, 2022

(65) Prior Publication Data
US 2023/0043843 A1 Feb. 9, 2023

(30) Foreign Application Priority Data
Aug. 3, 2021 (FR) ...................................... 2108415

(51) Int. Cl.
*B64D 37/30* (2006.01)
*B64D 37/04* (2006.01)
*B64D 37/32* (2006.01)
*B64D 37/34* (2006.01)

(52) U.S. Cl.
CPC ............. *B64D 37/30* (2013.01); *B64D 37/04* (2013.01); *B64D 37/32* (2013.01); *B64D 37/34* (2013.01)

(58) Field of Classification Search
CPC ........ B64D 37/04; B64D 37/30; B64D 37/32; B64D 37/34; B64D 37/0005; B64C 3/34
See application file for complete search history.

(56) References Cited

U.S. PATENT DOCUMENTS

| 6,896,222 | B2* | 5/2005 | Dossas | ...................... B64B 1/62 244/30 |
|---|---|---|---|---|
| 2007/0034741 | A1* | 2/2007 | Fuller | ..................... B64D 27/24 244/58 |
| 2015/0069184 | A1* | 3/2015 | Barmichev | ............ B64D 37/30 244/135 R |
| 2015/0246717 | A1* | 9/2015 | Fournier | ................. B60L 50/75 244/30 |
| 2015/0344145 | A1 | 12/2015 | Epstein et al. | |

FOREIGN PATENT DOCUMENTS

| GB | 899312 A | 6/1962 |
|---|---|---|
| GB | 2587560 A | 3/2021 |

OTHER PUBLICATIONS

French Search Report; priority document.

* cited by examiner

*Primary Examiner* — Michael C Zarroli
*Assistant Examiner* — Ka Chun Leung
(74) *Attorney, Agent, or Firm* — Greer, Burns & Crain, Ltd.

(57) ABSTRACT

An aircraft including at least one hydrogen engine, at least one hydrogen supply device including at least one hydrogen tank and at least one item of equipment through which the hydrogen flows and which is positioned between the hydrogen tank and the hydrogen engine. The aircraft includes at least one sealed container sealed from the outside air, in which sealed container the equipment of the hydrogen supply device is positioned. This solution allows a safe hydrogen installation to be obtained using existing equipment.

23 Claims, 7 Drawing Sheets

AIRCRAFT COMPRISING AT LEAST ONE HYDROGEN SUPPLY DEVICE AND AT LEAST ONE SEALED CONTAINER, IN WHICH AT LEAST ONE ITEM OF EQUIPMENT OF SAID HYDROGEN SUPPLY DEVICE IS POSITIONED

CROSS-REFERENCES TO RELATED APPLICATIONS

This application claims the benefit of the French patent application No. 2108415 filed on Aug. 3, 2021, the entire disclosures of which are incorporated herein by way of reference.

FIELD OF THE INVENTION

The present application relates to an aircraft comprising at least one hydrogen supply device and at least one sealed container sealed from the air outside the container, in which at least one item of equipment of the hydrogen supply device is positioned.

BACKGROUND OF THE INVENTION

According to one embodiment, an aircraft comprises a plurality of hydrogen-powered propeller engines and at least one hydrogen supply device configured to supply the engines.

This hydrogen supply device comprises a hydrogen tank positioned in the fuselage of the aircraft, a high-pressure pump for pressurizing the hydrogen, a heat exchanger configured to heat the hydrogen that transitions from the liquid state to the gaseous state, and various ducts for connecting the hydrogen tank, the pump, the heat exchanger and the engine.

The ducts are double-skinned pipes for preventing any hydrogen leaks.

Designing a heat exchanger or a high-pressure pump with a high level of safety in terms of hydrogen leaks proves to be complex or leads to high costs for such equipment.

The present invention aims to address all or some of the disadvantages of the prior art.

SUMMARY OF THE INVENTION

To this end, the aim of the invention is an aircraft comprising at least one hydrogen engine and at least one hydrogen supply device comprising at least one hydrogen tank and at least one item of equipment, through which the hydrogen flows and which is positioned between the hydrogen tank and the hydrogen engine.

According to the invention, the aircraft comprises at least one sealed container sealed from the air outside said container, in which the item of equipment, or at least one of the items of equipment, of the hydrogen supply device is positioned.

Positioning the one or more items of equipment of the hydrogen supply device in at least one sealed container sealed from the air outside said container (and thus having a low oxygen content) allows a safe hydrogen installation to be obtained using existing equipment.

According to another feature, the sealed container, or at least one of the sealed containers, comprises at least one connector configured to connect an apparatus for injecting an inert gas or an evacuation apparatus.

According to another feature, the sealed container, or at least one of the sealed containers, comprises at least one sensor from among an oxygen sensor configured to detect the presence of oxygen or a given concentration of oxygen inside the sealed container and a hydrogen sensor configured to detect the presence of hydrogen or a given concentration of hydrogen inside the sealed container.

According to another feature, the sealed container, or at least one of the sealed containers, comprises at least one extraction system from among an extraction system configured to extract oxygen present in the sealed container and an extraction system configured to extract hydrogen present in the sealed container.

According to another feature, the hydrogen supply device comprises at least one detachable connection system upstream or downstream of the sealed container, or of at least one of the sealed containers.

According to another feature, the hydrogen supply device comprises at least one valve upstream or downstream of the sealed container, or of at least one of the sealed containers.

According to another feature, the aircraft comprises at least one structure and the sealed container, or at least one of the sealed containers, is a sealed casing separate from said structure of the aircraft, the aircraft comprising at least one linkage system connecting the sealed casing and said structure of the aircraft.

According to another feature, the aircraft comprises a wing having a plurality of boxes, with the sealed casing, or at least one of the sealed casings, being positioned in one of the boxes of the wing.

According to another feature, the aircraft comprises at least one structure and the sealed container, or at least one of the sealed containers, is at least partly demarcated by said structure of the aircraft.

According to another feature, the aircraft comprises a wing having a plurality of boxes, with the sealed container, or at least one of the sealed containers, being demarcated by at least part of one of the boxes of the wing and at least one sealing bulkhead.

According to another feature, the wing comprises upper and lower walls, front and rear spars and ribs demarcating the boxes of the wing. In addition, at least one wall from among the upper and lower walls comprises, in line with at least one item of equipment or at least one sealed casing, an opening sealably closed by a detachable hatch.

According to another feature, the at least one item of equipment of the hydrogen supply device is a pump or a heat exchanger.

According to another feature, the hydrogen supply device comprises a plurality of items of equipment, through which the hydrogen flows and which are positioned between the hydrogen tank and the hydrogen engine, with said plurality of items of equipment being disposed in said at least one sealed container.

According to another feature, the hydrogen supply device comprises a plurality of items of equipment, through which the hydrogen flows and which are positioned between the hydrogen tank and the hydrogen engine, and the aircraft comprises a plurality of sealed containers sealed from the air outside said container, with at least one of the items of equipment of the hydrogen supply device being positioned in each sealed container.

BRIEF DESCRIPTION OF THE DRAWINGS

Further features and advantages will become apparent from the following description of the invention, which is provided solely by way of an example, with reference to the appended drawings, in which.

DETAILED DESCRIPTION OF THE PREFERRED EMBODIMENTS

Figure 1:
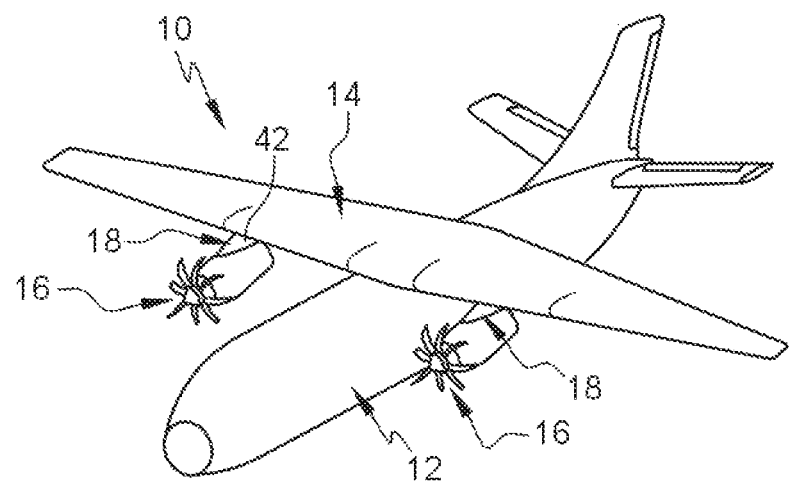
FIG. 1 is a perspective view of an aircraft.

According to one embodiment shown in FIG. 1, an aircraft 10 comprises a fuselage 12, a wing 14 and propulsion assemblies 16 positioned under the wing 14 and each connected to the wing 14 by a pylon 18.

According to one embodiment particularly shown in FIGS. 5 to 11, the wing 14 extends between a leading edge 20 and a trailing edge 22, has a structure 24 that comprises an upper wall 26, a lower wall 28, a front spar 30.1, parallel to the leading edge 20, positioned in the vicinity thereof and connecting the upper and lower walls 26, 28, a rear spar 30.2, parallel to the front spar 30.1, positioned in the vicinity of the trailing edge 22 and connecting the upper and lower walls 26, 28, and ribs 32 positioned in planes perpendicular to the front and rear spars 30.1, 30.2 and connecting the upper and lower walls 26, 28.

According to this configuration, the wing 14 comprises a plurality of boxes 34 demarcated by the upper and lower walls 26, 28, the front and rear spars 30.1, 30.2 and the ribs 32.

According to one embodiment, each propulsion assembly 16 comprises a propulsion propeller 36 and a hydrogen engine 38 rotating the propulsion propeller 36.

According to one configuration, the pylon 18 comprises a primary structure 40 connecting the propulsion assembly 16 and the wing 14, and a secondary structure 42 surrounding the primary structure 40 in order to provide the pylon 18 with aerodynamic performance capabilities.

Figure 2:
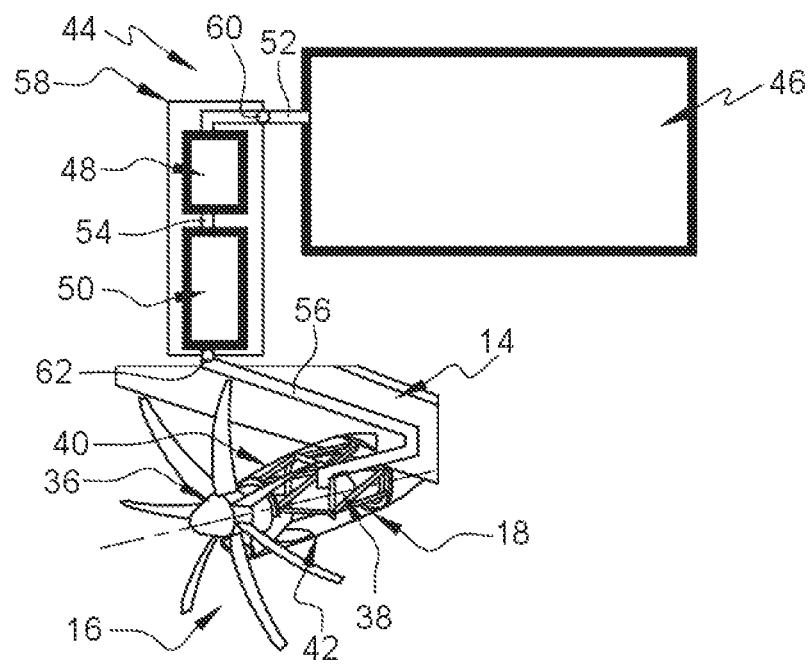
FIG. 2 is a schematic representation of a propeller engine and a hydrogen supply device illustrating one embodiment of the invention.

As illustrated in FIG. 2, the aircraft 10 comprises, for each propulsion assembly 16, a hydrogen supply device 44 having at least one hydrogen tank 46 positioned in the fuselage 12, a pump 48 for pressurizing the hydrogen, a heat exchanger 50 configured to heat the hydrogen, and hydrogen ducts connecting the hydrogen tank 46, the pump 48, the heat exchanger 50, and the hydrogen engine 38. According to one configuration, the hydrogen supply device 44 comprises a first hydrogen duct 52 connecting the hydrogen tank 46 and the pump 48, a second hydrogen duct 54 connecting the pump 48 and the heat exchanger 50, and a third hydrogen duct 56 connecting the heat exchanger 50 and the hydrogen engine 38.

The hydrogen tank 46 can be shared by a plurality of propulsion assemblies 16. According to one configuration, the pump 48 is a high-pressure pump. The heat exchanger 50 is configured to heat the hydrogen so that the hydrogen transitions from the liquid state to the gaseous state. The hydrogen ducts 52, 54, 56 are double-skinned pipes (or ducts).

According to one configuration, the pump 48 and the heat exchanger 50 are disposed in the vicinity of the hydrogen engine 38. According to this configuration, the hydrogen is distributed from the hydrogen tank 46 to the hydrogen engine 38 with the hydrogen in the liquid state. The heat exchanger 50 in the vicinity of the hydrogen engine 38 heats the hydrogen so that it transitions from the liquid state to the gaseous state.

According to another configuration, the pump 48 is disposed in the vicinity of the hydrogen tank 46 and the heat exchanger 50 is disposed in the vicinity of the hydrogen engine 38. According to this configuration, the hydrogen is distributed from the hydrogen tank 46 to the hydrogen engine 38 with the hydrogen in the liquid state. The heat exchanger 50 in the vicinity of the hydrogen engine 38 heats the hydrogen so that it transitions from the liquid state to the gaseous state.

According to another configuration, the pump 48 and the heat exchanger 50 are disposed in the vicinity of the hydrogen tank 46. According to this configuration, the hydrogen is distributed from the hydrogen tank 46 to the hydrogen engine 38 with the hydrogen in the gaseous state. An additional heat exchanger (not shown in the figures) is disposed in the vicinity of the hydrogen engine 38, and is configured to heat the gaseous hydrogen, before it enters the hydrogen engine 38.

The aircraft 10 comprises at least one sealed container 58, in which at least one item of equipment from among the pump 48 and the heat exchanger 50 of the hydrogen supply device 44 is positioned.

Figure 3:
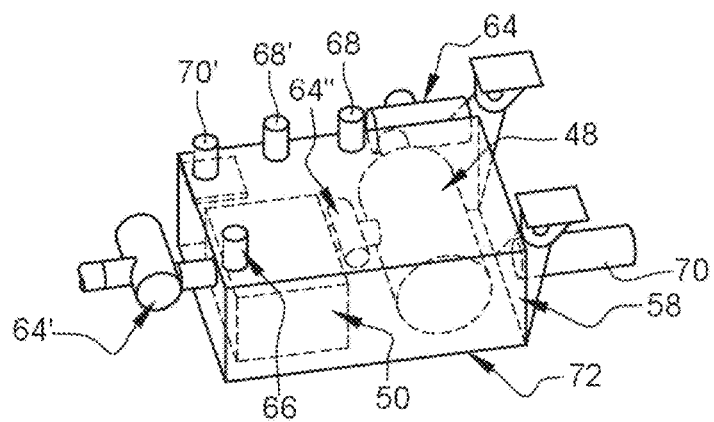
FIG. 3 is a perspective view of a sealed container, in which a heat exchanger and a pump are positioned, illustrating one embodiment of the invention.

According to a first embodiment shown, for example, in FIGS. 2 and 3, the aircraft 10 comprises a sealed container 58, in which the pump 48 and the heat exchanger 50 are positioned. The sealed container 58 comprises an upstream through-hole 60 for the first hydrogen duct 52 and a downstream through-hole 62 for the third hydrogen duct 56.

According to a first configuration, the first and third hydrogen ducts 52, 56 pass through the upstream and downstream through-holes 60, 62 and are sealably connected with the sealed container 58.

According to another configuration, at least one hydrogen duct from among the first and third hydrogen ducts 52, 56 comprises an outer section positioned outside the sealed container 58, an inner section positioned inside the sealed container 58 and a detachable connection system connecting the outer and inner sections and positioned in line with the upstream or downstream through-hole 60, 62 or slightly offset toward the outside of the sealed container 58. According to one arrangement, the supply device comprises two detachable connection systems upstream and downstream of the sealed container 58. Thus, the sealed container 58 and the elements positioned therein can be disconnected from the rest of the hydrogen supply device 44.

According to one configuration, the hydrogen supply device 44 comprises at least one valve 64 upstream or downstream of the sealed container 58, positioned on one of the hydrogen ducts 52, 54, 56 and configured to assume an open state, in which it allows a flow of hydrogen in the hydrogen duct, and a closed state, in which it prevents a flow of hydrogen in the hydrogen duct. According to one arrangement, the hydrogen supply device 44 comprises two valves 64, 64' upstream and downstream of the sealed container 58. Thus, the elements positioned inside the sealed container 58 can be isolated from the rest of the hydrogen supply device 44. According to one configuration, another valve 64" is positioned inside the sealed container 58 between the pump 48 and the heat exchanger 50.

Figure 4:
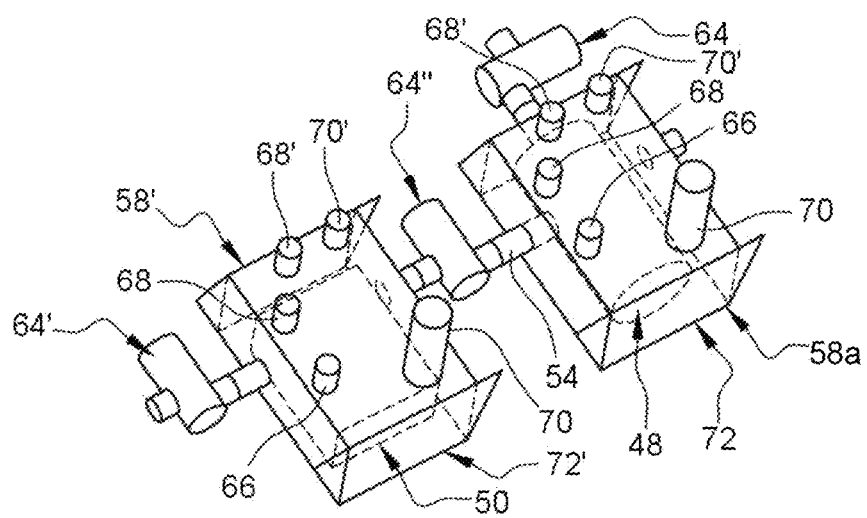
FIG. 4 is a perspective view of a first sealed container, in which a pump is positioned, and of a second sealed container, in which a heat exchanger is positioned, illustrating a second embodiment of the invention.
Figure 5:
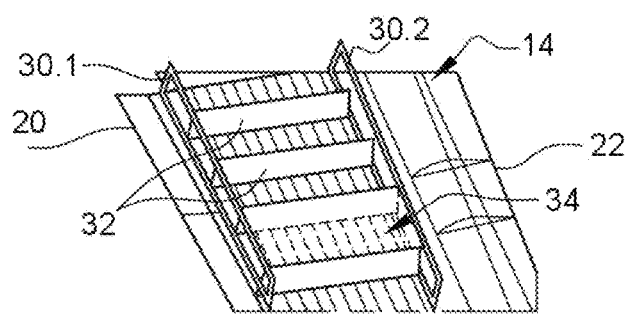
FIG. 5 is a schematic representation of part of an aircraft wing comprising at least one sealed box.

According to a second embodiment shown, for example, in FIG. 4, the aircraft 10 comprises a first sealed container 58a, in which the pump 48 is positioned, and a second sealed container 58', in which the heat exchanger 50 is positioned. According to this embodiment, the pump 48 and the heat exchanger 50 are positioned in two separate sealed containers 58a, 58'. Each sealed container 58a, 58' comprises an upstream through-hole 60 and a downstream through-hole 62 for the hydrogen ducts 52, 54, 56.

As in the first embodiment, the hydrogen supply device 44 comprises at least one detachable connection system and/or at least one valve 64 upstream and/or downstream of at least one sealed container from among the first and second sealed containers 58a, 58'. According to one configuration, a first valve 64 is arranged upstream of the first sealed container 58a, a second valve 64' is arranged downstream of the second sealed container 58' and a third valve 64" is arranged between the first and second sealed containers 58a, 58'.

At least one of the sealed containers 58a, 58' comprises at least one connector 66 configured to connect an apparatus for injecting an inert gas or an evacuation apparatus for extracting the gas present in the sealed container 58a, 58'. This solution allows the oxygen present in the sealed container 58a, 58' to be removed by replacing the gas present in the sealed container 58a, 58' with an inert gas or by removing it in order to obtain a vacuum inside the sealed container 58a, 58'.

According to one embodiment, at least one of the sealed containers 58a, 58' comprises at least one sensor 68 configured to detect oxygen or hydrogen present in the sealed container 58a, 58'. According to one configuration, each sealed container 58a, 58' comprises a first oxygen sensor 68 for detecting the presence of oxygen or a given concentration of oxygen inside the sealed container 58a, 58' and a second hydrogen sensor 68' configured to detect the presence of hydrogen or a given concentration of hydrogen inside the sealed container 58a, 58'.

According to one embodiment, at least one of the sealed containers 58a, 58' comprises at least one extraction system 70 configured to remove oxygen or hydrogen present inside the sealed container 58a, 58'. According to one configuration, each sealed container 58a, 58' comprises a first extraction system 70 configured to extract oxygen present in the sealed container 58a, 58', for example when the first sensor 68 detects the presence of oxygen in the sealed container 58a, 58'. Each sealed container 58a, 58' comprises a second extraction system 70' configured to extract hydrogen present in the sealed container 58a, 58', for example when the second sensor 68' detects a concentration of hydrogen in the sealed container 58a, 58' that is above a given threshold.

According to a first embodiment, the sealed container 58, 58a, or at least one of the sealed containers 58, 58a, 58', is a sealed casing 72 separate from the structure of the aircraft, as illustrated in FIGS. 3, 4, 11, 13 to 18.

By way of an example, the sealed casing 72 is parallelepiped shaped.

According to one configuration, the sealed casing 72 comprises at least two parts that are sealably and detachably connected together in order to grant access to the inside of the sealed casing 72. By way of an example, the sealed casing 72 comprises a first part having a bottom and four side walls and a second part in the form of a cover configured to be sealably and detachably connected to the side walls of the first part. Of course, the invention is not limited to this embodiment for the sealed casing 72.

Figure 11:
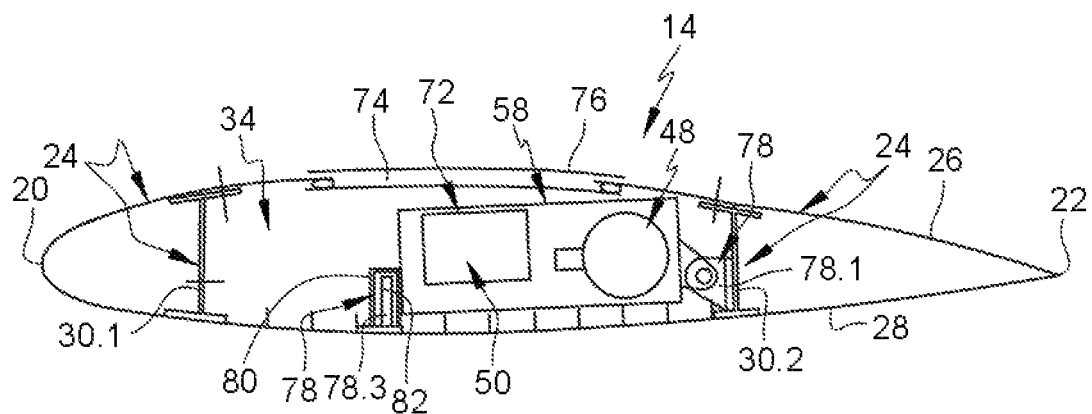
FIG. 11 is a cross section of a box of an aircraft wing, in which a sealed casing is positioned, illustrating one embodiment of the invention.
Figure 13:
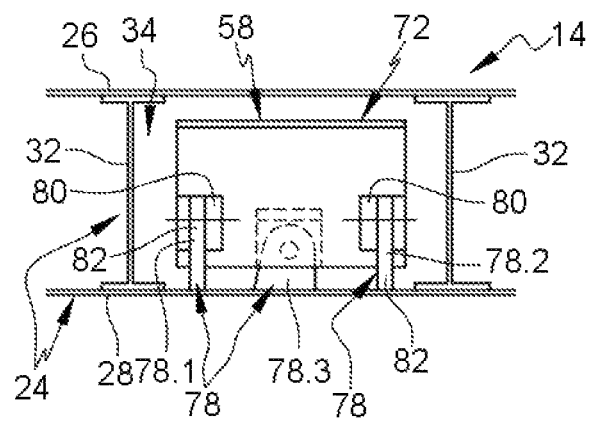
FIG. 13 is a schematic representation of a fastening system for the sealed casing shown in FIG. 11 illustrating one embodiment of the invention.
Figure 14:
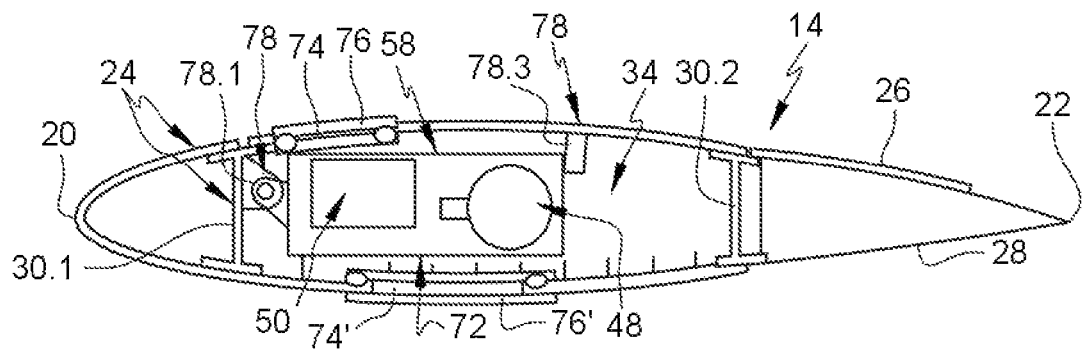
FIG. 14 is a cross section of a box of an aircraft wing, in which a sealed casing is positioned, illustrating another embodiment of the invention.

According to a first arrangement shown in FIGS. 11, 13 and 14, the pump 48 and the heat exchanger 50 are positioned in the same sealed casing 72 positioned in one of the boxes 34 of the wing 14. In FIG. 11, the sealed casing 72 is arranged in a rear part of the wing 14 (in the vicinity of the rear spar 30.2, and the trailing edge 22). In FIG. 14, the sealed casing 72 is arranged in a front part of the wing 14 (in the vicinity of the front spar 30.1, and the leading edge 20).

Figure 15:
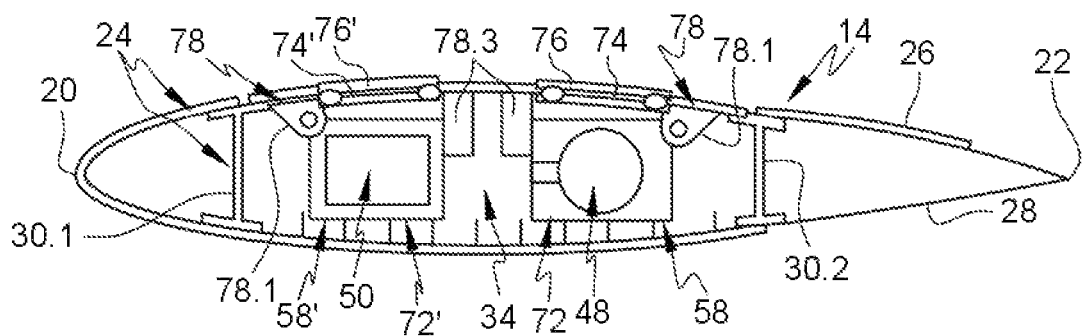
FIG. 15 is a cross section of a box of an aircraft wing, in which two sealed casings are positioned, illustrating another embodiment of the invention.

According to a second arrangement shown in FIG. 15, the pump 48 is positioned in a first sealed casing 72 positioned in a first box 34 of the wing and the heat exchanger 50 is positioned in a second sealed casing 72' positioned in the first box 34 of the wing. The first sealed casing 72 in this case is positioned in a rear part of the wing 14 (in the vicinity of the rear spar 30.2), while the second sealed casing 72' is arranged in a front part of the wing 14 (in the vicinity of the front spar 30.1). Of course, this configuration is not limiting. Although it is not shown, the heat exchanger 50 can be positioned in a second sealed casing 72' in a second box 34, separate from the first box 34. The box 34, in which at least one sealed casing 72, 72' is positioned, is located as close as possible to the primary structure 40. The box 34, in which at least one sealed casing 72, 72' is positioned, can be sealed or non-sealed.

Figure 12:
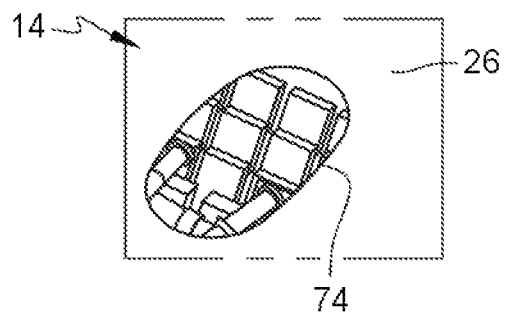
FIG. 12 is a top view of the wing shown in FIG. 11, without a hatch.

According to one configuration, at least one wall from among the upper and lower walls 26, 28 comprises at least one opening 74 (shown in FIG. 12), in line with at least one sealed casing 72, sealably closed by a detachable hatch 76. According to the embodiment shown in FIG. 13, the upper wall 26 comprises an opening 74 closed by a hatch 76. The hatch 76 shown in FIG. 11 is arranged substantially in the middle of the upper wall 26 (between the leading edge 20 and the trailing edge 22). According to another embodiment shown in FIG. 15, the upper wall 26 comprises two openings 74, 74' closed by hatches 76, 76'. Each opening 74, 74', and therefore each hatch 76, 76', is disposed above, i.e., facing, a sealed container 58, 58', which in this case assumes the form of a sealed casing 72, 72'. These hatches 76, 76' are smaller than the dimensions of the hatch 76 in FIG. 11. According to another embodiment shown in FIG. 14, the upper wall 26 comprises a first opening 74 closed by a first hatch 76 and the lower wall 28 comprises a second opening 74' closed by a second hatch 76'. The first opening 74 and the first hatch 76 are disposed on a front portion (in the vicinity of the leading edge 20) of the upper wall 26, while the second opening 74' and the second hatch 76' are disposed on a central portion of the lower wall 28. The location of the openings 74, 74' and of the hatches 76, 76' can vary as a function of the location of the equipment 48, 50 of the hydrogen supply device 44. For example, one or more openings 74, 74' and one or more hatches 76, 76' can be present on the upper wall 26 and/or on the lower wall 28. The dimensions of the openings 74, 74' and of the hatches 76, 76', and the number thereof, can also vary as a function of the dimensions of the sealed containers 58, 58', the sealed casings 72, 72' and the boxes 34.

Figure 16:
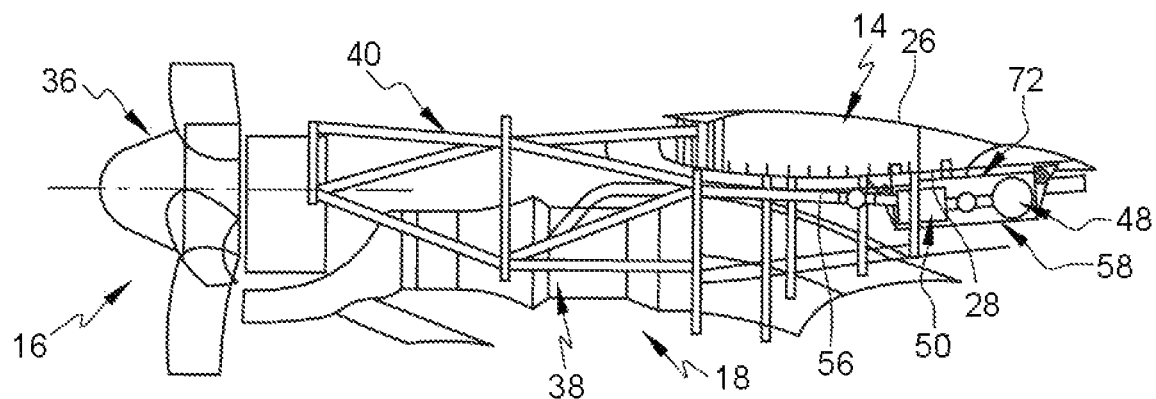
FIG. 16 is a lateral schematic representation of a propulsion assembly without a cowling and of a sealed casing positioned under the wing, illustrating another embodiment of the invention.
Figure 17:
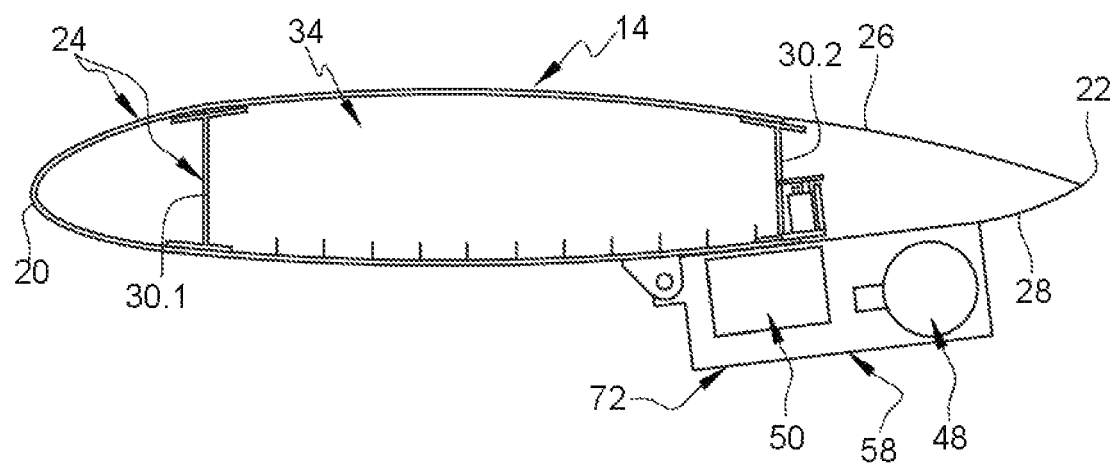
FIG. 17 is a cross section of an aircraft wing and of a sealed casing positioned under the wing, illustrating another embodiment of the invention.
Figure 18:
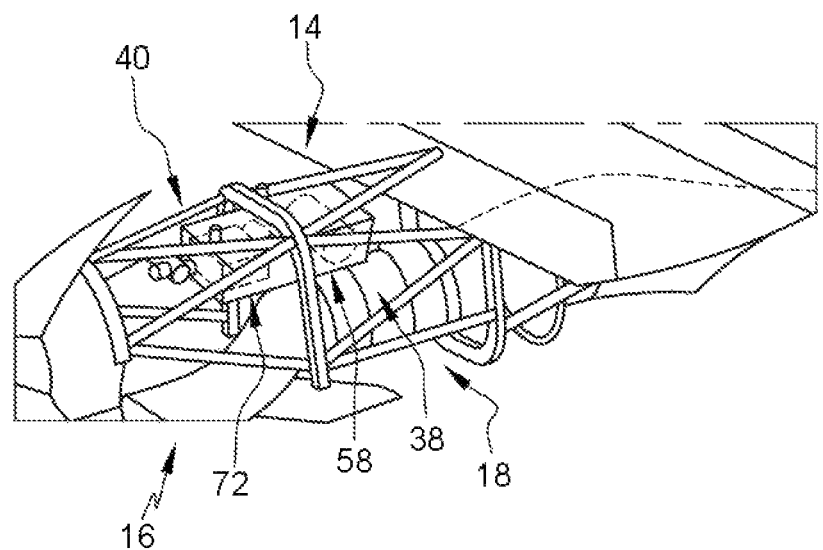
FIG. 18 is a schematic representation of a propulsion assembly illustrating another embodiment of the invention.

According to a third arrangement shown in FIGS. 16 to 18, the sealed casing 72, or at least one of the sealed casings 72, 72', is positioned outside the wing 14, in particular inside the secondary structure 42 of the pylon 18. According to one configuration, the sealed casing 72, or at least one of the sealed casings 72, 72', is positioned under the wing 14 and is connected thereto, as shown in FIGS. 16 and 17, or to the primary structure 40 of the pylon 18 inside the secondary structure 42, as shown in FIG. 18. In FIG. 17, the sealed casing 72 is positioned under the wing 14 and is connected thereto on the lower wall 28 and the rear spar 30.2. Of course, the sealed casing 72 could be positioned under the wing and fastened to the wing on the lower wall 28, or on the lower wall and the front spar 30.1.

The sealed casing 72, or at least one of the sealed casings 72, 72', is connected to at least one structure of the aircraft, such as the primary structure 40 of the pylon 18 or the structure 24 of the wing 14, for example, by at least one linkage system 78.

According to one embodiment shown in FIGS. 11 and 13, the linkage system 78 comprises first and second joints 78.1, 78.2 connecting a first lateral face of the sealed casing 72 and the rear spar 30.2 and/or the lower wall 28 of the wing 14, and a third joint 78.3 connecting a second lateral face of the sealed casing 72 (opposite the first face) and the lower wall 28 of the wing 14.

According to this embodiment, each first, second or third joint 78.1, 78.2, 78.3 comprises a clevis 80 rigidly connected to the sealed casing 72, and a wing 82 rigidly connected to the structure 24 of the wing 14, with the clevis 80 and the wing 82 being connected by a pivot pin. According to one arrangement, the pivot pins of the first and second joints 78.1, 78.2 are aligned and oriented in a first direction, with the pivot pin of the third joint 78.3 being oriented in a second direction approximately perpendicular to the first direction. Preferably, the pivot pins are detachable so that the sealed casing 72 can be disconnected from the structure of the aircraft to which it is connected.

Of course, the invention is not limited to these fastening points for the sealed casing 72 or to this embodiment for the linkage system 78. The sealed casing 72 could be connected to the front spar 30.1, as shown in FIG. 14, to the upper wall 26, as shown in FIGS. 14 and 15, or only to the lower wall 28, or to one or more ribs 32. According to one configuration, the sealed casings 72, 72' can be connected to the front spar 30.1, and/or to the upper wall 26, and/or to the lower wall 28, and/or to the rear spar 30.2, to one or more ribs 32, with the fastening points for the sealed casings 72, 72' being different between said casings. For example, a first sealed casing 72 can be connected to the front spar 30.1 and to the upper wall 26, while a second sealed casing 72' is connected to the rear spar 30.2 and to the upper wall 26. According to another example, a first sealed casing 72 can be connected to the front spar 30.1 and to the lower wall 28, while a second sealed casing 72' is connected to the rear spar 30.2 and to the lower wall 28.

Figure 6:
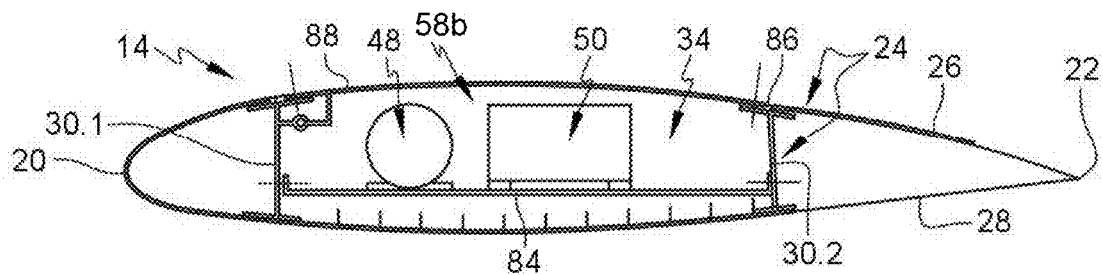
FIG. 6 is a cross section of a sealed box of an aircraft wing, in which a pump and a heat exchanger are positioned, illustrating one embodiment of the invention.
Figure 7:
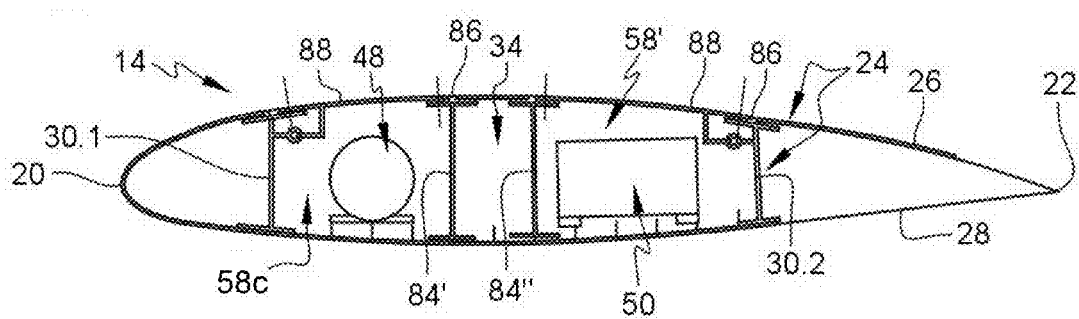
FIG. 7 is a cross section of a sealed box of an aircraft wing, in which a pump and a heat exchanger are positioned, illustrating one embodiment of the invention.
Figure 8:
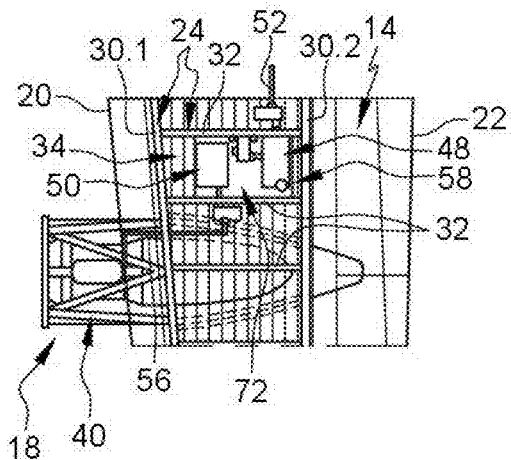
FIG. 8 is a top view of part of an aircraft wing illustrating a first arrangement of the invention.
Figure 9:
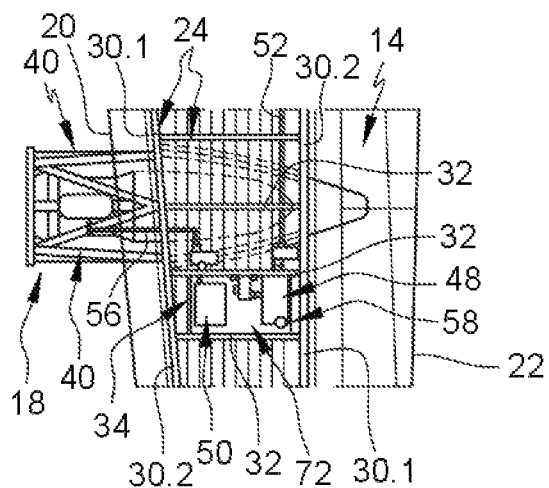
FIG. 9 is a top view of part of an aircraft wing illustrating a second arrangement of the invention.
Figure 10:
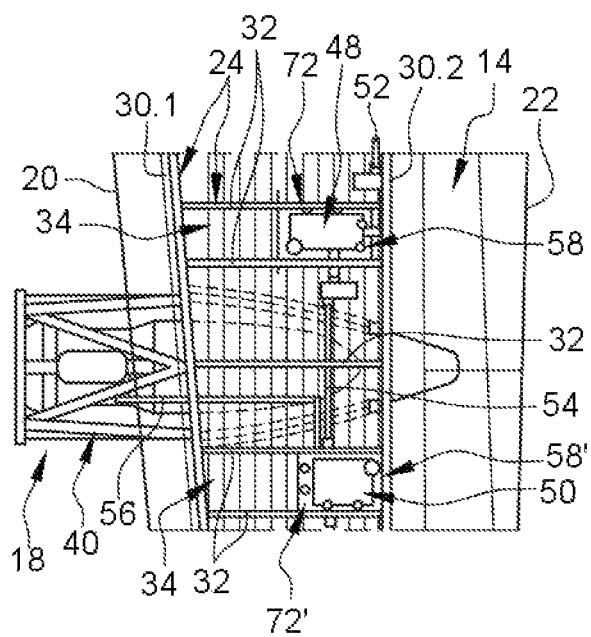
FIG. 10 is a top view of part of an aircraft wing illustrating a third arrangement of the invention.

According to a second embodiment shown in FIGS. 6 and 7, the sealed container 58*b*, 58*c*, or at least one of the sealed containers 58*b*, 58*c*, 58', is at least partly demarcated by at least one structure of the aircraft.

According to one embodiment, the sealed container 58*b*, 58*c*, or at least one of the sealed containers 58*b*, 58*c*, 58', is demarcated by at least part of a box 34 of the wing 14 and optionally at least one sealing bulkhead 84, 84', 84".

According to one configuration, the sealed container 58*b*, 58*c*, or at least one of the sealed containers 58*b*, 58*c*, 58', is demarcated by the upper and lower walls 26, 28, the front and rear spars 30.1, 30.2 and two ribs 32 of the wing 14 that are configured and connected so as to obtain a sealed box 34. According to this configuration, the box 34 can comprise a floor connecting the front and rear spars 30.1, 30.2 and two ribs 32, substantially horizontal during operation, to which at least one element from among the pump 48 and the heat exchanger 50 is fastened. As an alternative embodiment, the pump 48 and/or the heat exchanger 50 are fastened to the lower wall 28.

According to another configuration, the sealed container 58*b*, or at least one of the sealed containers 58*b*, 58', is demarcated by the upper or lower wall 26, 28, the front and rear spars 30.1, 30.2, two ribs 32 and a substantially horizontal sealing bulkhead 84. The upper or lower wall 26, 28, the front and rear spars 30.1, 30.2, the two ribs 32 and the sealing bulkhead 84 are then configured and connected so as to form a sealed container 58*b*, in which the pump 48 and the heat exchanger 50 are positioned.

The upper or lower wall 26, 28 that demarcates the sealed container 58*b*, 58*c*, 58' can comprise an opening 86 sealably closed by a hatch 88. The hatch 88 is fastened, in particular bolted, to the upper or lower wall 26, 28. The hatch 88 is thus structural. The hatch 88 is also detachable. More specifically, the hatch 88 is hinged via ball joint clevises, so as to allow the hatch 88 to open when the fastenings (bolts) are removed. The hatch 88 comprises, for example, two clevises, between which a ball joint is disposed that is fastened to a front or rear spar 30.1, 30.2, or to a rib 32. The hatch 88 is hinged via the ball joint clevises with a clearance, so as to allow the hatch 88 to be supported on each of its sides when it is fastened to the upper or lower wall 26, 28 (i.e., during bolting). The clevises of the hatch 88 are reserved, and are only used for opening the hatch 88. The clevises of the hatch 88 therefore are not used when the hatch 88 is bolted to the upper or lower wall 26, 28.

According to another configuration shown in FIG. 7, a first sealed container 58*c* is demarcated by the upper and lower walls 26, 28, the front spar 30.1, two ribs 32 and a first sealing bulkhead 84' substantially parallel to the front spar 30.1. The upper and lower walls 26, 28, the front spar 30.1, the two ribs 32 and the first sealing bulkhead 84' are then configured and connected so as to form a first sealed container 58*c*. A second sealed container 58' is demarcated by the upper and lower walls 26, 28, the rear spar 30.2, two ribs 32 and a second sealing bulkhead 84" substantially parallel to the rear spar 30.2. The upper and lower walls 26, 28, the rear spar 30.2, the two ribs 32 and the second sealing bulkhead 84" are then configured and connected so as to form a second sealed container 58'. The first and second sealing bulkheads 84', 84" are positioned between the same pair of ribs 32. According to this configuration, the pump 48 is positioned in the first sealed container 58c and the heat exchanger 50 is positioned in the second sealed container 58'.

At least one wall from among the upper and lower walls 26, 28 comprises, in line with at least the pump 48 or the heat exchanger 50, an opening 86 sealably closed by a detachable hatch 88. In FIG. 7, the upper wall 26 comprises an opening 86 closed by a structural hatch 88 in line with the pump 48, and an opening 86 closed by another structural hatch 88 in line with the heat exchanger 50.

According to one embodiment, at least one of the first and second sealed containers 58c, 58' comprises a floor, on which the heat exchanger 50 or the pump 48 is fastened.

Other solutions can be contemplated for partitioning at least one box 34 of the wing 14 in order to obtain at least one sealed container 58c, 58'.

Of course, the invention is not limited to the previously described embodiments for the sealed container 58c, 58' or the hydrogen supply device 44. In any embodiment, the aircraft 10 comprises:
a. at least one hydrogen engine 38;
b. at least one hydrogen supply device 44, which comprises;
  i. at least one hydrogen tank 46;
  ii. at least one item of equipment 48, 50, such as a pump 48 or a heat exchanger 50, for example, through which the hydrogen flows and which is positioned between the hydrogen tank 46 and the hydrogen engine 38;
c. at least one sealed container 58, 58a, 58b, 58c sealed from the outside air, in which the equipment of the hydrogen supply device is positioned;

The sealed container 58, 58a, 58b, 58c advantageously contains a low oxygen content. A low oxygen content is understood to mean that the oxygen concentration is insufficient to cause an explosion or ignition of the hydrogen. This low oxygen content can be obtained by inerting or evacuating the inside of the sealed container 58, 58a, 58b, 58c.

Equipment is understood to mean an element other than a duct, configured to modify at least one characteristic of the hydrogen, such as the pressure or the temperature, for example.

According to one configuration, the same aircraft can comprise at least one sealed container 58 in the form of a sealed casing 72 separate from the structure of the aircraft and at least one sealed container 58 at least partially demarcated by a structure of the aircraft.

The invention allows a safe hydrogen installation to be obtained using existing equipment.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
at least one hydrogen engine,
at least one hydrogen supply device comprising at least one hydrogen tank and at least one item of equipment, through which the hydrogen flows and which is positioned between the at least one hydrogen tank and the at least one hydrogen engine,
at least one sealed container sealed from air outside said at least one sealed container, in which said at least one item of equipment of the at least one hydrogen supply device is positioned,
at least one structure, and wherein said at least one sealed container is a sealed casing separate from said at least one structure of the aircraft, and
at least one linkage system connecting the sealed casing and said at least one structure of the aircraft, and
a wing having a plurality of boxes, and wherein said sealed casing is positioned in one of the boxes of the wing.

2. The aircraft according to claim 1, wherein said at least one sealed container comprises at least one connector configured to connect an apparatus for injecting an inert gas.

3. The aircraft according to claim 1, wherein said at least one sealed container comprises at least one connector configured to connect an evacuation apparatus.

4. The aircraft according to claim 1, wherein said at least one sealed container comprises at least one oxygen sensor configured to detect the presence of oxygen or a given concentration of oxygen inside said at least one sealed container.

5. The aircraft according to claim 1, wherein said at least one sealed container comprises at least one hydrogen sensor configured to detect the presence of hydrogen or a given concentration of hydrogen inside said at least one sealed container.

6. The aircraft according to claim 1, wherein said at least one sealed container comprises at least one extraction system configured to extract oxygen present in said at least one sealed container.

7. The aircraft according to claim 1, wherein said at least one sealed container comprises at least one extraction system configured to extract hydrogen present in said at least one sealed container.

8. The aircraft according to claim 1, wherein the at least one hydrogen supply device comprises at least one detachable connection system upstream or downstream of the at least one sealed container.

9. The aircraft according to claim 1, wherein the at least one hydrogen supply device comprises at least one valve upstream or downstream of the at least one sealed container.

10. The aircraft according to claim 1, wherein the wing comprises upper and lower walls, front and rear spars and ribs demarcating the boxes of the wing, with at least one wall from among the upper and lower walls comprising, in line with at least one item of equipment or at least one sealed casing, an opening sealably closed by a detachable hatch.

11. The aircraft according to claim 1, wherein the at least one item of equipment of the at least one hydrogen supply device is a pump or a heat exchanger.

12. The aircraft according to claim 1, wherein the at least one hydrogen supply device comprises a plurality of items of equipment, through which the hydrogen flows and which are positioned between the at least one hydrogen tank and the at least one hydrogen engine, and the aircraft comprises a plurality of sealed containers sealed from the air outside said plurality of sealed container, with at least one of the items of equipment of the at least one hydrogen supply device being positioned in each of the plurality of sealed container.

13. An aircraft comprising:
at least one hydrogen engine,
at least one hydrogen supply device comprising at least one hydrogen tank and at least one item of equipment, through which the hydrogen flows and which is positioned between the at least one hydrogen tank and the at least one hydrogen engine,
at least one sealed container sealed from air outside said at least one sealed container, in which said at least one item of equipment of the at least one hydrogen supply device is positioned,
at least one structure, and wherein said at least one sealed container is at least partly demarcated by said at least one structure of the aircraft,
a wing having a plurality of boxes and wherein said at least one sealed container is demarcated by at least part of one of the boxes of the wing and at least one sealing bulkhead.

14. The aircraft according to claim 13, wherein said at least one sealed container comprises at least one connector configured to connect an apparatus for injecting an inert gas.

15. The aircraft according to claim 13, wherein said at least one sealed container comprises at least one connector configured to connect an evacuation apparatus.

16. The aircraft according to claim 13, wherein said at least one sealed container comprises at least one oxygen sensor configured to detect the presence of oxygen or a given concentration of oxygen inside said at least one sealed container.

17. The aircraft according to claim 13, wherein said at least one sealed container comprises at least one hydrogen sensor configured to detect the presence of hydrogen or a given concentration of hydrogen inside said at least one sealed container.

18. The aircraft according to claim 13, wherein said at least one sealed container comprises at least one extraction system configured to extract oxygen present in said at least one sealed container.

19. The aircraft according to claim 13, wherein said at least one sealed container comprises at least one extraction system configured to extract hydrogen present in said at least one sealed container.

20. The aircraft according to claim 13, wherein the at least one hydrogen supply device comprises at least one detachable connection system upstream or downstream of the at least one sealed container.

21. The aircraft according to claim 13, wherein the at least one hydrogen supply device comprises at least one valve upstream or downstream of the at least one sealed container.

22. The aircraft according to claim 13, wherein the at least one item of equipment of the at least one hydrogen supply device is a pump or a heat exchanger.

23. The aircraft according to claim 13, wherein the at least one hydrogen supply device comprises a plurality of items of equipment, through which the hydrogen flows and which are positioned between the at least one hydrogen tank and the at least one hydrogen engine, and the aircraft comprises a plurality of sealed containers sealed from the air outside said plurality of sealed container, with at least one of the items of equipment of the at least one hydrogen supply device being positioned in each of the plurality of sealed container.

* * * * *